United States Patent
Jonassen et al.

(10) Patent No.: US 6,748,670 B1
(45) Date of Patent: Jun. 15, 2004

(54) METHOD AND APPARATUS FOR DRYING A POROUS MATRIX

(75) Inventors: Ola Jonassen, Bratsberg (NO); Ingvald Strømmen, Ranheim (NO); Per Arne Schieflo, Trondheim (NO); Odilio Alves-Filho, Kattem (NO)

(73) Assignee: DTech AS, Trondheim (NO)

( * ) Notice: Subject to any disclaimer, the term of this patent is extended or adjusted under 35 U.S.C. 154(b) by 0 days.

(21) Appl. No.: 09/701,900

(22) PCT Filed: Jun. 7, 1999

(86) PCT No.: PCT/NO99/00187

§ 371 (c)(1),
(2), (4) Date: Aug. 3, 2001

(87) PCT Pub. No.: WO99/64802

PCT Pub. Date: Dec. 16, 1999

(30) Foreign Application Priority Data

Jun. 8, 1998 (NO) .......................................... 19982626

(51) Int. Cl.$^7$ ................................................. F26B 7/00
(52) U.S. Cl. .............................. 34/378; 34/363; 34/497; 34/579; 264/51
(58) Field of Search .......................... 34/363, 367, 375, 34/378, 410, 497, 570, 579, 219; 264/41, 48, 45.1, 45.4, 50, 51

(56) References Cited

U.S. PATENT DOCUMENTS

| 5,486,246 A | * | 1/1996 | Kelley | 149/2 |
| 5,527,498 A | * | 6/1996 | Kelley | 264/3.4 |
| 5,629,191 A | * | 5/1997 | Cahn | 435/395 |
| 6,592,787 B2 | * | 7/2003 | Pickrell et al. | 264/44 |

* cited by examiner

Primary Examiner—Pamela A Wilson
(74) Attorney, Agent, or Firm—Pitney Hardin LLP

(57) ABSTRACT

Method of drying a medium for producing a porous matrix from a solution, a paste, an extract, a granulated material or such, where a liquid inert agent is fed into a vessel (5) at controlled pressure and amount through a valve (7), transferring the pressurized liquid inert agent to a mixing vessel (4), said mixing vessel (4) also receiving the solution, such as paste, extract or granulated material, through an inlet valve (10), adjusting the pressure and temperature inside the mixing vessel (4) to desired levels by a release valve (6), upon complete mixing of the inert agent with the solution, the mixture is expanded into a porous matrix and injected into a drying circuit through a drying chamber (3), the matrix thereby being kept suspended in the drying chamber by the flowing drying medium, supplied by the blower (2), the matrix moisture being removed from the mixture through a heat exchanger coil comprising a first heat exchanger (11) where the water vapour is condensed and removed from the circuit and finally the drying medium is adjusted to the desired inlet condition in a heat exchanger (1) before the drying medium flows through the matrix and the process is repeated.

4 Claims, 1 Drawing Sheet

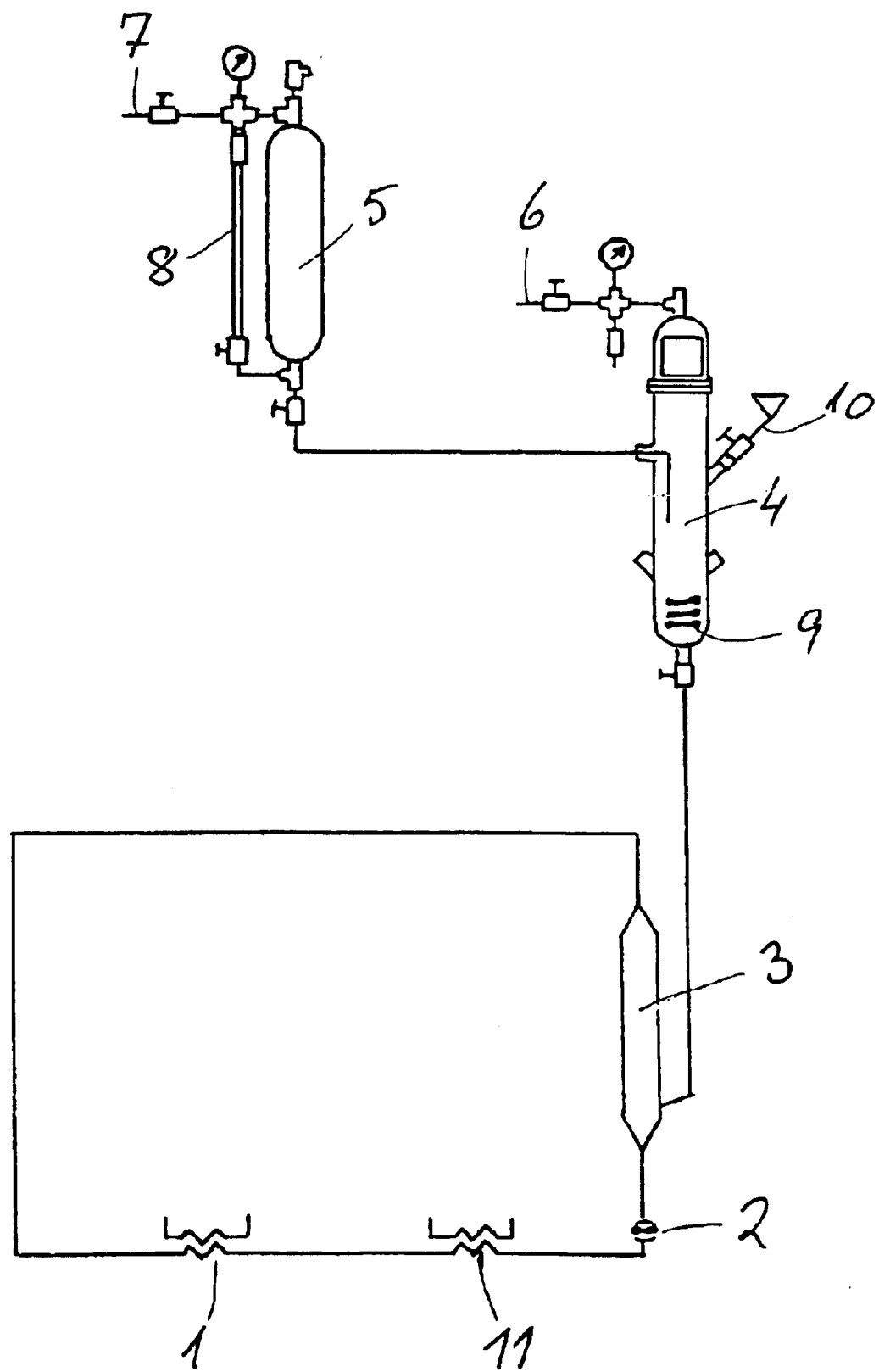

METHOD AND APPARATUS FOR DRYING A POROUS MATRIX

BACKGROUND OF THE INVENTION

1. Field of the Invention

The present invention is related to a method and an apparatus for producing a porous matrix from a solution, a paste, an extract, a granulated material or such, and the drying process.

2. Description of the Prior Art

Developments are continuously made to make processes and apparatus and connectors with freeze drying more economical, more accurate, to a higher degree capturing aromatic and nutritious ingredients during the, freeze drying process.

With the method and the apparatus according to present invention, the dryer may operate at different temperature levels and inlet conditions below the freezing point of the material, enabling removal of substantial amount of moisture within a shorter residence time.

With the method according to the present invention is provided a flexibility on the operation since a solution, a suspension, a paste, juices, extract and even finely granulated sticky products can be mixed with an inert agent and expanded as to form a porous matrix. Said porous matrix is progressively dried as it is introduced into the drying chamber, said drying chamber thereby comprising means to adjust the inlet conditions as provided by the heat exchanger and the blower.

By closed loop circulation of the drying air or other media, processing contaminations are avoided and a maximum retention of the final product aroma or odorants as well as other heat sensitive organic components, which would have been lost i open processes.

Uncoupled heat exchangers provide conditioned drying media at appropriate and different levels as to attain minimum thermal inactivation while avoiding degradation of heat sensitive or delicate products. To avoid environmental and thermal pollutions, natural refrigerants are used in the uncoupled heat exchangers.

SUMMARY OF THE INVENTION

The above described advantages are achieved with the method and the apparatus according to the present invention.

According to the invention, an inert agent is introduced into the structural raw material which may be a solution, a paste, an extract, a granulated material or such, whereafter the raw material is expanded to above or below the freezing point of the raw material and to a lower pressure, thereby producing a matrix mainly consisting of solids, pores and ice crystals. The resulting matrix may be frozen prior, or during the drying process or may be directly introduced into drying chamber.

The frozen matrix is placed into the drying chamber of the apparatus whereafter the dryer is activated. The moisture removed from the matrix is guided as an exhaust medium through a heat exchanger having cooled surface coils in which the water vapour condenses and thereafter is removed from the drying circuit.

In the next phase the drying medium is conditioned to the desired and preset inlet condition of the drying chamber by using the heated surface of the heat exchanger. This process is repeated continuously as the drying medium is reentered the drying chamber containing the matrix.

With the apparatus according to the present invention the inert agent is mixed with a matrix in a controlled mixing process. For this purpose the apparatus comprises several components also for conditioning the drying medium.

Reservoir 1 for the inert agent and reservoir 2 for the raw material are preferably made of stainless steel. The outlet of said reservoirs is accurately controlled for fine proposing of the mass fractions, by the use of flow meters and control valves. Pressure and temperature at the reservoir inlets and outlets are recognized by sensors and indicators arranged in the reservoir piping, fittings and connections.

The dryer as such consists of a closed loop in which the drying medium flows after being conditioned in the heat exchanger. The surfaces of the heat exchanger may be independently heated respectively cooled or may as such be connected with the appropriate refiguration systems and heat pumps.

A blower, when activated, provides the flow of the drying medium through drying chamber containing the fixed or fluidized bed of porous frozen matrix, whereafter the drying as such is accomplished by heat transfer and mass transport mechanisms. The heated and cooled surfaces of the heat exchanger promote dehumidifaction and conditioning of the drying medium and may be adjusted to provide desired specification and thermal sensitivity of the matrix by specific chamber designs and preset inlet conditions.

With the method and apparatus according to the present invention the dryer is able to operate at different temperature levels and the inlet conditions may be preset at or below the final freezing point of the raw material, such that nearly all of the moisture in the matrix is removed. In connection therewith, the circuit temperature of the heat exchanger may be changed in order to increase the temperature of the drying medium, controlling the relative humidity and consequently attaining a high degree of water removal and a short residence time of the matrix.

The design of the dryer as such enables use of only a fraction of the energy used in conventional processes. Furthermore the closed drying circuit avoids contamination as such, as frequently observed with commercial open systems.

Due to the higher operation temperature and higher operation pressure, the drying process according to the present invention is less expensive than commonly available drying systems having similar capacities. Furthermore the final product from the dryer provides higher and more uniform quality than conventional dryers and spray dryers operating at much higher temperature which furthermore is unsuitable for heat sensitive materials.

BRIEF DESCRIPTION OF THE DRAWINGS

FIG. 1 is a schematic view of an apparatus according to the invention.

DETAILED DESCRIPTION OF THE PREFERRED EMBODIMENT

The only FIGURE discloses schematically the apparatus arrangement with its vital components. A liquid inert agent is fed into a vessel 5 at controlled pressure and amount through a valve 7. The valve 7 also permits dosing the amount of inert agent inside vessel 5, as inspected through glass level indicator 8.

From the vessel 5 the pressurized liquid inert agent is transferred to the mixing vessel 4 which also receives the solution (paste, extract or granulated material) through an inlet valve 10. The pressure and temperature inside the mixing vessel 4 is adjusted through the release valve 6. A multi-propeller agitator 9 rotates accordingly to provide a complete mixing of the inert agent with the solution.

From the mixing vessel 4, the solution is expanded into a porous matrix and is injected into drying circuit through the drying chamber 3. The matrix is kept suspended in the drying chamber by the flowing drying medium, which is supplied by the blower 2.

Besides keeping the porous matrix suspended during the process, the medium re-circulates the drying circuit in a closed loop. After removing the matrix moisture the exhaust medium is moved through a heat exchanger coil comprising a first heat exchanger 11 where the water vapour is condensed and removed from the circuit. Thereafter the drying medium is adjusted to the desired inlet condition in the heat exchanger 1. Finally the drying medium flows through the matrix and the process is repeated.

We claim:

1. Method of drying a medium for producing a porous matrix from a structural raw material, CHARACTERIZED IN feeding a liquid inert agent into a vessel (5) at controlled pressure and amount through a valve (7), transferring the pressurized liquid inert agent to a mixing vessel (4), said mixing vessel (4) also receiving the structural raw material through an inlet valve (10), adjusting the pressure and temperature inside the mixing vessel (4) to desired levels by a release valve (6), upon complete mixing of the inert agent with the structural raw material, the mixture is expanded into a porous matrix and injected into a drying circuit through a drying chamber (3), the matrix thereby being kept suspended in the drying chamber by a drying medium, supplied by a blower (2), moisture being removed from the mixture through a heat exchanger coil comprising a first heat exchanger (11) where the water vapour is condensed and removed from the circuit and finally the drying medium is adjusted to the desired inlet condition in a second heat exchanger (1) before the drying medium returns to the drying chamber (3) and again flows through the matrix.

2. A method as claimed in claim 1 wherein said structural raw material is selected from the group consisting of a solution, a paste, an extract and a granulated material.

3. Apparatus adapted for drying a medium for producing a porous matrix from a structural raw material, CHARACTERIZED IN the apparatus comprising a valve (7) being connected with a vessel (5) for feeding a liquified inert agent into the vessel (5) at controlled pressure and rate, the valve (7) thereby allowing dosing of the agent, a mixing vessel (4) being connected with the vessel (5) adapted to receive pressurized liquid inert agent as well as the structural raw material through an inlet valve (10), a release valve (6) thereby controlling the pressure and the temperature inside the mixing vessel (4), an agitator (9) inside the mixing vessel (4) thereby ensuring complete mixing of the agent with the solution, a drying chamber (3) being connected with the mixing vessel (4) to receive the mixture as a porous matrix which thereby is injected into a drying circuit through the drying chamber (3), and a first heat exchanger (10) being connected with the circuit for condensing and removing the water vapour from the circuit, the drying medium thereafter being adjusted to the inlet condition of the drying chamber (3) by a second heat exchanger (1).

4. An apparatus as claimed in claim 3 wherein said structural raw material is selected from the group consisting of a solution, a paste, an extract and a granulated material.

\* \* \* \* \*